United States Patent [19]

Araujo et al.

[11] Patent Number: 5,634,955
[45] Date of Patent: Jun. 3, 1997

[54] PROCESS OF MAKING CHANNEL WAVEGUIDES IN GEL-SILICA

[75] Inventors: F. G. Araujo, Belo Horizonte, Brazil; T. Chia, Taiwan, Taiwan; L. L. Hench, Gainesville, Fla.

[73] Assignee: The United States of America as represented by the Secretary of the Air Force, Washington, D.C.

[21] Appl. No.: 387,986

[22] Filed: Feb. 13, 1995

[51] Int. Cl.$^6$ .................................................. C03B 8/00
[52] U.S. Cl. ........................... 65/17.2; 65/17.3; 65/33.1; 65/33.2; 65/386; 65/392; 65/395; 264/1.27; 204/157.41; 204/157.45; 204/157.51
[58] Field of Search .................... 65/385, 386, 392, 65/395, 17.2, 17.3, 33.1, 33.2; 264/1.27; 204/157.41, 157.45, 157.51

[56] References Cited

U.S. PATENT DOCUMENTS 5,080,962  1/1992  Hench ........................ 428/218
5,101,413  3/1992  Botez ........................ 372/50

OTHER PUBLICATIONS

Chia, T. et al., "Micro–Optical Arrays by Laser Densification of Gel–Silica Matrices", SPIE vol. 1758 Sol–Gel Optics II (1992) pp. 215–226.

Chia, Taipau, et al "Fabrication of Microlenses by Laser Densification on Gel Silica Glass", Chemical Processing of Advanced Materials, pp. 933–939. (1992), John Wiley & Sons, Inc.

Primary Examiner—Ellis Robinson
Assistant Examiner—Timothy M. Speer
Attorney, Agent, or Firm—Thomas C. Stover

[57] ABSTRACT

Optical waveguides are produced in laser densified Type VI porous gel-silica. A $CO_2$ laser directly scans the substrate having a pore size of about 30 angstroms. Tracks having a width of about 50 microns are produced.

7 Claims, 4 Drawing Sheets

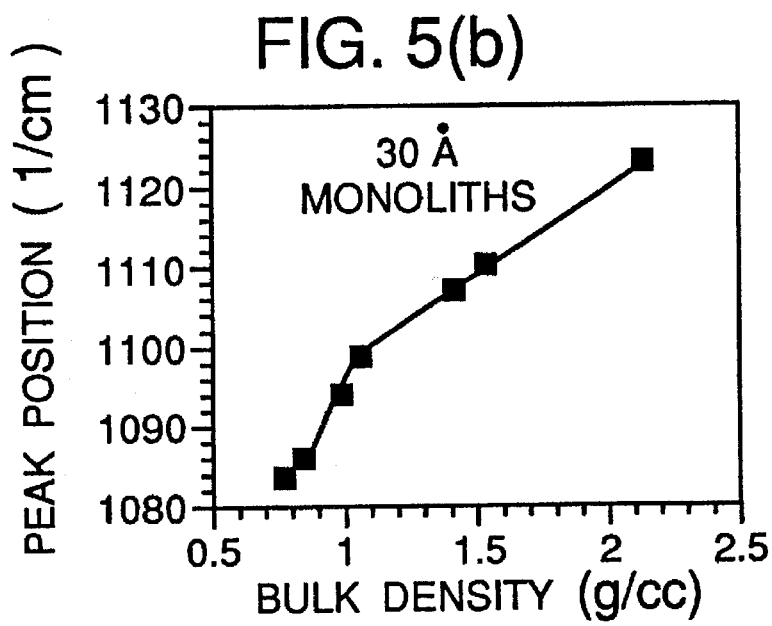
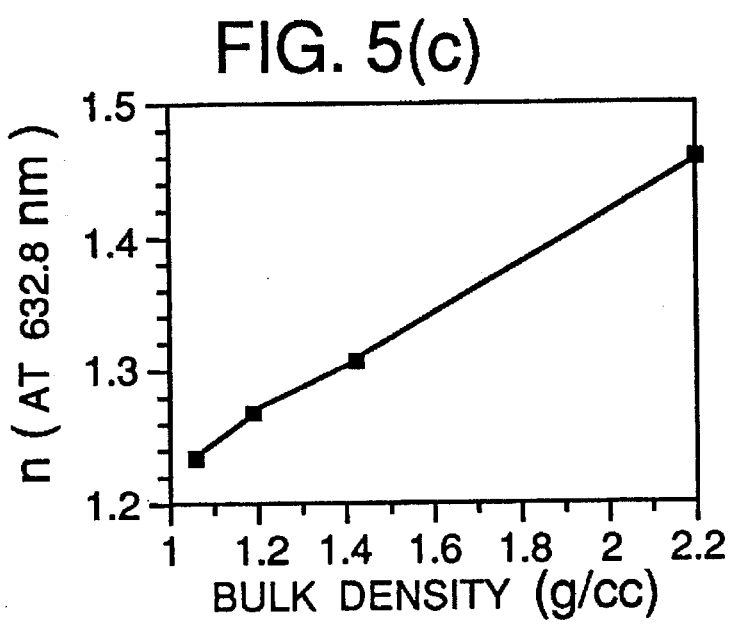

PROCESS OF MAKING CHANNEL WAVEGUIDES IN GEL-SILICA

STATEMENT OF GOVERNMENT INTEREST

The invention described herein may be manufactured and used by or for the Government for governmental purposes without the payment of any royalty thereon.

BACKGROUND OF THE INVENTION

The present invention relates to a process of making optical components in gel-silica, and, in particular, to an improved process of making channel waveguides therein.

Optical channel waveguides are fundamental devices in optical signal processing as they interface fiber optics with electro-optic circuits which convert the optical information into electronic signals. The simplest method available today for the production of such devices is ion exchange at the surface of silica-based glasses. In this method, high mobility silica network modifiers, such as $Na_2O$, are exchanged with monovalent ions, e.g., alkali, thallium and silver ions. Ion size and polarization effects lead to a localized increase in the refractive index of the glass. This procedure usually required masking of the substrate by photolithography, followed by immersion of the masked substrate in a controlled environment containing the dopant. Drawbacks in this procedure are the need of chemical manipulation with its respective environmental implications and the poor flexibility of the photolithographic processes, as new masks have to be produced for each new waveguide designed.

Laser direct writing is a substitute for the photolithographic based processes, offering lower overall process costs, higher circuit density and improved design flexibility. This statement only holds as long as substrates are suitable for the laser irradiation and can be provided for the desired application. For optical communications such substrates are the Type VI porous gel-silica optics which can be densified by the heat generated in the interaction with a $CO_2$ laser beam lasing at 10.6 μm.

Gel-silica monoliths with 14 Å pore radius are today the only commercially produced product and have excellent optical properties. Previous studies used substrates with 14 Å pores and with an initial density of 2.0 g/cc since lower densities of the 14 Å material have a strong tendency to foam and/or crack under $CO_2$ laser scans.

Preliminary studies showed that laser densified tracks could be made in gels with a pore radius of 45 Å and a density of 1.1 g/cc. Other densities of these gels have not been used for laser densification because the 45 Å material densifies rapidly at 1150° C. Although their as-cast surface quality may cause too much scatter for an optical communications device, the 45 Å gels are a useful system for laser densification, as they only tend to foam under very extreme conditions, and yield a large value of index gradient.

Previous studies showed that laser densification could be used to produce gradient refractive index (GRIN) optical devices on Type VI gel-silica substrates. In order to achieve optically transparent optical components it was necessary to control processing variables of substrate density, relative humidity, laser power, and distance of the objective lens to the substrate.

SUMMARY OF THE INVENTION

Direct laser writing in Type VI porous gel-silica is able to produce tracks 50 microns wide using a $CO_2$ laser operating at 10.6 microns. The optimum pore radius was determined to be about 30 angstroms and the densities ranged from 1.1 to about 2.1 g/cc.

The densification process consisted of scanning the surface of a porous gel-silica monolith with a $CO_2$ laser beam collimated to a spot size of about 75 microns. The power of the laser beam at the surface depends on the number of elements between the surface and the laser head. The energy concentration depends mainly on the type of collimation and the distance from the lens at which the surface is placed. The speed of movement of the monolith across the laser beam spot determines the amount of energy transferred to the surface and the temperature achieved by the surface layer. Laser pulses of 1.5 s. were used, sufficient for the surface to cross the beam at scanning speeds of 1.4 to 3.0 cm./s. The laser power on the surface was attenuated by partial reflectors and varied from 0.6 W to 1.25 W as the beam was collimated to about 75 microns.

Advantages of laser production of channel waveguides on the surface of porous gel-silica matrices are rapid processing time, <1 second for simple patterns, and ease of computer control of the direct writing method.

The new silica optical matrices with a pore radius of 30 Å were developed for laser densification of waveguides. Laser densified tracks were produced in samples of the 30 Å matrices with densities ranging from 1.1 to 2.1 g/cc. Greater attention was paid to these gels because they are very versatile with respect to the parameters of the laser densification, have a very good as-cast surface quality, and present a shorter UV cut-off than the 45 Å gels treated at the same temperatures.

Therefore, one object of the present invention is to provide a process for direct laser writing of channel waveguides in gel-silica substrates.

Another object of the present invention is to provide a process for producing transparent optical waveguides having high transmission in the UV-VIS spectrum.

Another object of the present invention is to provide a process for laser production of channel waveguides on the surface of porous gel-silica which is rapid, takes less than one second for simple patterns and can be computer controlled.

Another object of the present invention is to provide a process to produce optically transparent multimode waveguides with dimensions close to those required by the international standards.

These and many other objects and advantages of the present invention will be readily apparent to one skilled in the pertinent art from the following detailed description of a preferred embodiment of the invention and the related drawings.

BRIEF DESCRIPTION OF THE DRAWINGS

FIG. 5(b) peak position of 30 angstrom gel-silica glass substrates as a function of the bulk density; and FIG. 5(c) the index of refraction of gel-silica substrates as a function of the bulk density.

DETAILED DESCRIPTION OF THE PREFERRED EMBODIMENT

Three types of Type VI gel-glass substrates were prepared for laser densification with three different pore radii, 12 Å, 30 Å and 45 Å. All samples were dried for at least 1 h in a vacuum furnace at 150° C. prior to laser densification.

Figure 1A:
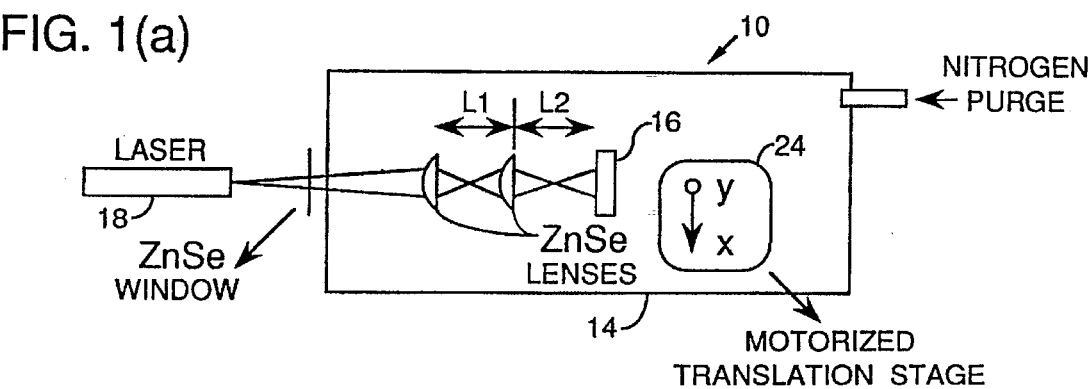
FIG. 1(a) and 1(b) illustrate the instrumental set-ups for the laser densification of gel-silica glasses.
Figure 1B:
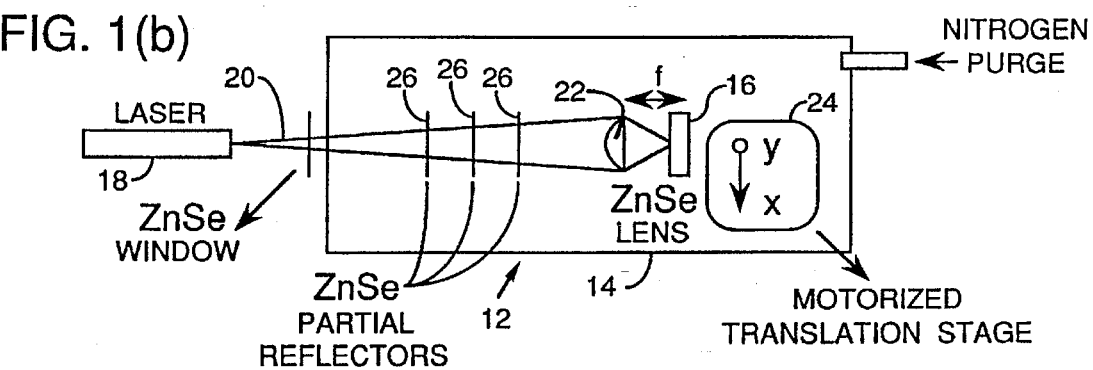

Two laser writing devices 10 and 12, FIGS. 1(a)–(b), were used, according to the width of the waveguide desired. The relative humidity was controlled to <20% in a chamber 14 by a nitrogen flow during the laser densification for both devices. FIG. 1(a) shows the device 10 for densification of tracks with a width of approximately 400 μm. FIG. 1(b) shows the device 12 which produced tracks ranging in width from 150 μm down to 50 μm.

The densification technique consists in scanning the surface of a porous gel-silica monolith 16 with a $CO_2$ laser 18 with a beam 20 collimated to a certain spot size at a specific distance from the objective lens 22. The power of the laser beam 20 at the sample depends on the number of elements between the monolith 16 and the laser head. The energy concentration depends mainly on the type of collimation and the distance from the lens at which the sample is placed. The speed of moving the sample by a computer controlled stage 24 across the laser spot determines the amount of energy transferred to the sample, and the temperature achieved by the surface layer. Laser pulses of 1.5 s were used, sufficient for the sample to cross the beam at scanning speeds of 1.4 to 3.0 cm/s. For device 10, the laser power on the surface of the sample was varied from 12 to 25 W, collimated to a spot not smaller than 400 μm in diameter. The laser power on the surface of the sample for device 12 was attenuated by partial reflectors 26, and varied from 0.6 W to 1.25 W, as the beam was collimated to approximately 74 μm.

The laser densified tracks were examined under an optical microscope to determine their dimensions and transparency. The level of densification was then evaluated for the transparent tracks with the use of an FTIR microscope. The analyzed spots were 50 μm×50 μm. To maximize the data, borders of adjacent analyzed spots were usually overlapped.

The device 10 was originally used for the production of microlens arrays. With this arrangement, collimating the laser beam to spots with diameters <400 μm led to cracking, foaming, and even surface ablation in gel-silica monoliths. This was caused by the fact that the lowest power produced by the laser head is of about 12.5 W. Use of a lower power laser head would not allow an easy collimation of the laser beam as the resulting decrease in beam diameter at the output of the laser would greatly increase the spherical aberration at the focal point. With the device 10, the smallest transparent laser tracks that could be produced were 400 μm wide.

This is a serious limitation since the core diameter of the most important multimode optical fibers are of the order of 50 μm. The device 12 was used to produce laser densified waveguides to comply with this specification.

A ZnSe meniscus lens 22 with a focal length (f) of 25.4 mm was used and the laser beam diameter on the lens (D) was approximately 4.8 mm. The M-squared value for the laser used was considered to be 1, as the laser is a low-power $CO_2$ laser, lasing in the TEM 00 mode. The diffraction limited spot size is then given by $$d_d = 1.27 \lambda \frac{f}{D} M^2 \qquad (1)$$

where $\lambda$=10.6 μm for the $CO_2$ laser.

The spherical aberration spot size for ZnSe meniscus lenses is given by the equation $$d_s = 0.0187 \frac{D^3}{f^2} \qquad (2)$$

Therefore the spot size is given by $$d = d_d + d_s \qquad (3)$$

which for device 12 corresponds to approximately 74 μm at the $1/e^2$ intensity.

Figure 2:
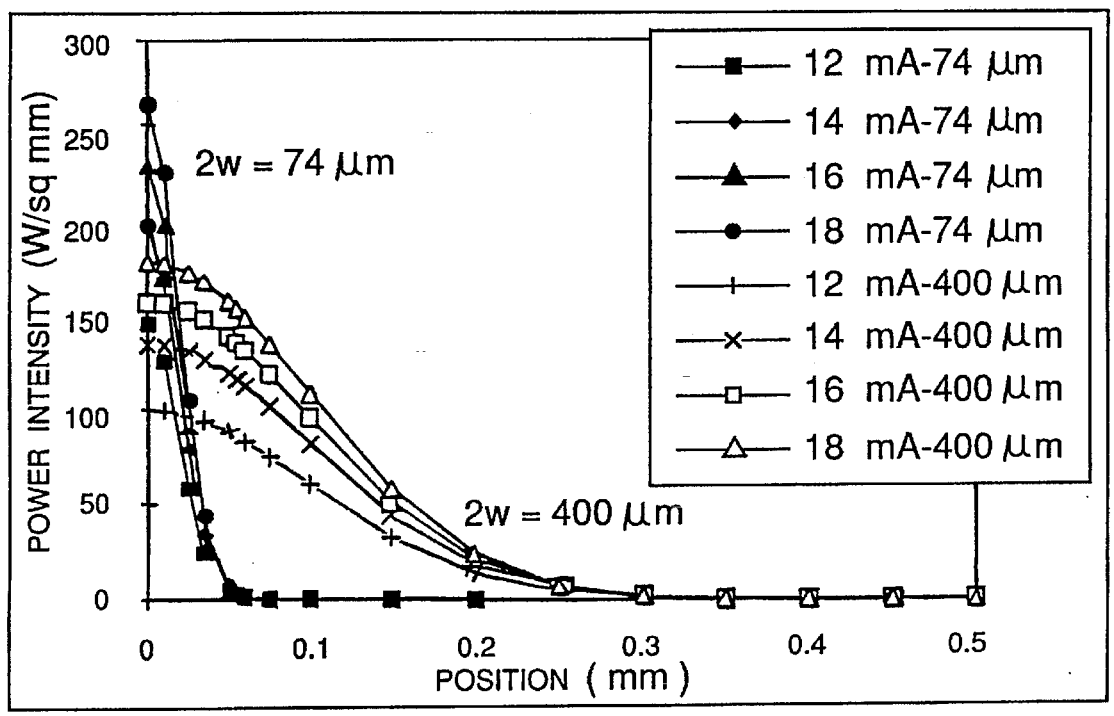
FIG. 2 illustrates the calculated intensity profiles of the laser beam.

FIG. 2 shows the calculated intensity profile of the laser beam for both set-ups in FIGS. 1(a) and (b). The curves for which the spot diameter is 74 μm (shown as two times the beam waist, 2 w), were produced by the device 12 shown in FIG. 1(b). The total power in the beam for this set of curves varies between 0.625 and 1.120 W, as measured by a laser power meter placed after the three partial reflectors and the 25.4 mm focal length lens. The other set of curves (2w=400 μm) was produced by the device 10 shown in FIG. 1(a), with total power in the beam ranging between 12.5 and 22.4 W. For the thinner tracks the samples were positioned at the focal spot of the lens, whereas for production of 400 μm tracks samples were at—two times the focal length.

The laser densified tracks produced for the device 10 had a minimum width of 400 μm, and 50 μm for the device 12. The minimum power intensity for densification of a track in the substrate can be inferred from the curves in FIG. 2. For 400 μm tracks it was calculated to be of about 13 W/mm². For 50 μm tracks it is approximately 58 W/mm², both at a scanning speed of 3.0 cm/s.

The power intensities at which transparent (open marks) and foamed or cracked (dark marks) densified laser tracks were produced are shown in FIG. 3 as a function of the substrate density for the 12, 30 and 45 Å matrices. The values plotted for the intensity correspond to the values at the center of the beam (0 mm in FIG. 2).

Figure 3A:
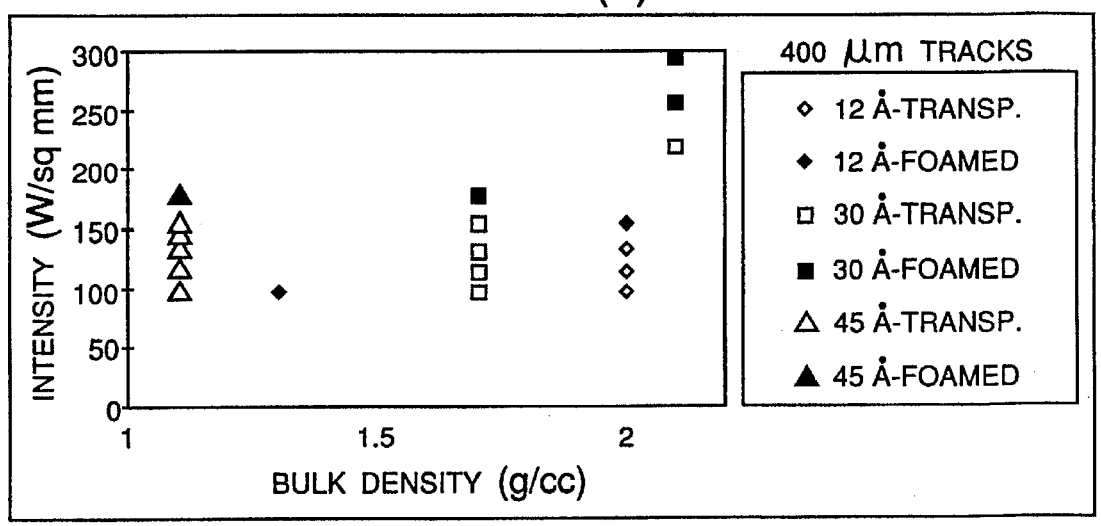
FIGS. 3(a) and 3(b) illustrates the power intensities at which transparent, foamed or cracked densified laser tracks were produced for different track widths.

FIG. 3(a) is for the tracks approximately 400 μm wide. Only tracks 400 μm wide are produced by power intensities around 100 W/mm², the others are slightly wider. This is determined by the minimum power intensity necessary for surface densification of the monoliths. This also holds for the 50 μm tracks at a power intensity of 150 W/mm², FIG. 3(b).

FIG. 3 shows that the larger the pore radius of the substrate, the wider is the power intensity vs. bulk density processing window to produce transparent densified laser tracks. Samples with 30 and 45 Å pores can be successfully laser densified even for densities well below 1.9 g/cc, which was never achieved for 12 matrices. As these small pore matrices are highly hygroscopic, foaming and cracking under laser scanning is attributed to trapping of water molecules inside the pores during their closure.

The better behavior of the larger pore matrices under laser densification is due to the lower surface area of these gels, i.e. 12 Å (630 m²/g), 30 Å (550 μm²/g), 45 Å (350 μm²/g). Gels with lower surface areas densify at higher temperatures enabling both the chemical and the physical waters to evaporate prior to the pore closure.

Figure 3B:
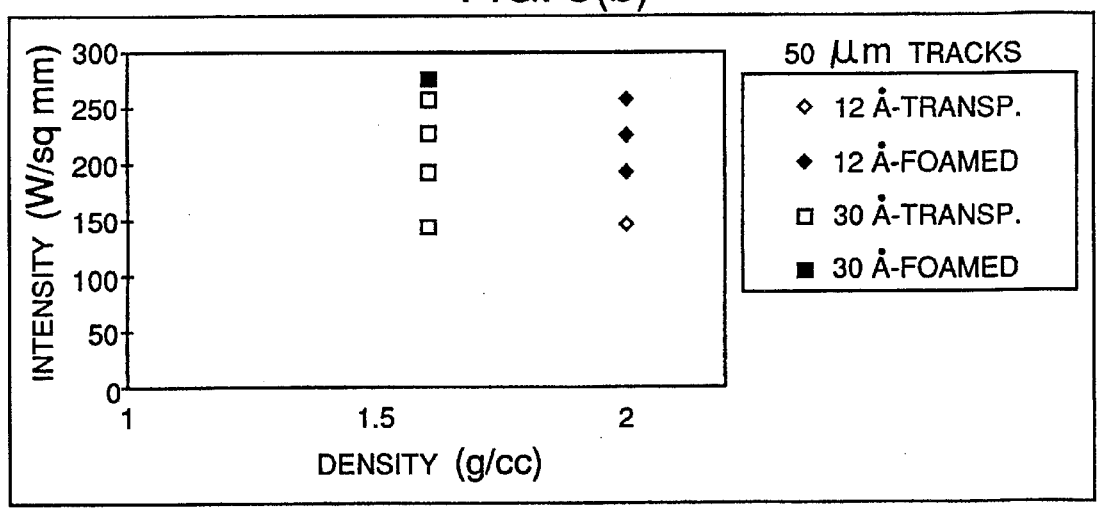

Comparing FIG. 3a and 3b, shows that larger power intensities are used to densify 50 μm tracks than is required for 400 μm tracks. This is caused by the smaller laser spot spending a shorter period of time over a specific point on the surface of the sample, leading to a smaller amount of energy delivered for the same incident intensity. A temperature profile at the surface of the sample is being calculated. It will depend on the geometry of the problem and on the properties of the matrices, as previously shown in the modeling of laser densified spots.

The 45 Å matrices present the largest processing window of the three types of substrates analyzed (FIG. 3a). However, the 30 Å matrices have, in addition to a large processing window for laser densification, a smaller value for the UV cut-off and a much better surface quality. Neither of these matrices require a chlorination step prior to densification, as is required by the 12 Å substrates.

The laser densified tracks were characterized by FTIR microspectroscopy. The shift on the peak position (PP) of the asymmetric si-O-si stretching vibration mode across the densified region was measured to evaluate the degree of densification of the tracks, according to a procedure previously described.

Figure 4:
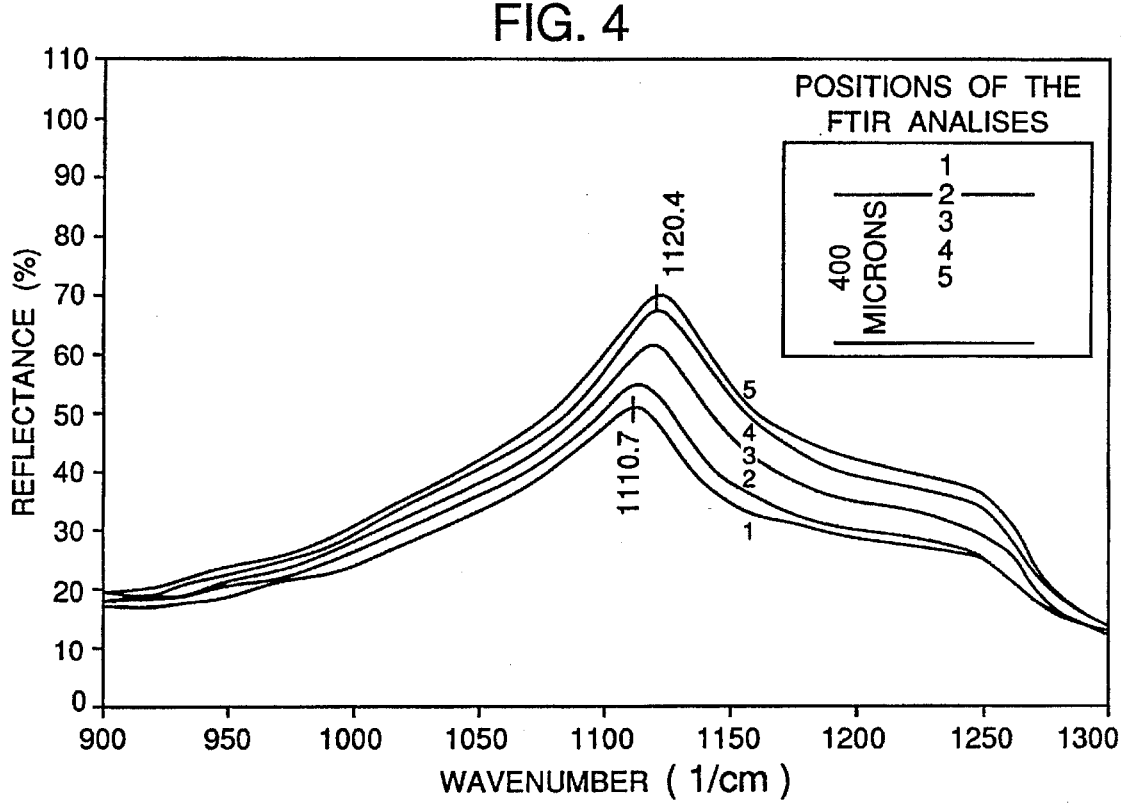
FIG. 4 illustrates FTIR spectra across a 400 micron wide laser densified track in a 30 angstrom porous gel-silica substrate and the respective PP shifts.

An example of the shift in the PP across a densified track is shown in FIG. 4 for a 400 μm track in a 30 Å substrate with an initial density of 1.7 g/cc. The position of the analyses are also shown. Due to the dimensions of the laser densified tracks produced in this work, all the FTIR analyses had to be standardized to 50 μm by 50 μm spots, which degrades somewhat the accuracy of the absolute values, as the size of this spot is below the diffraction limit for the wavelengths used.

Figure 5A:
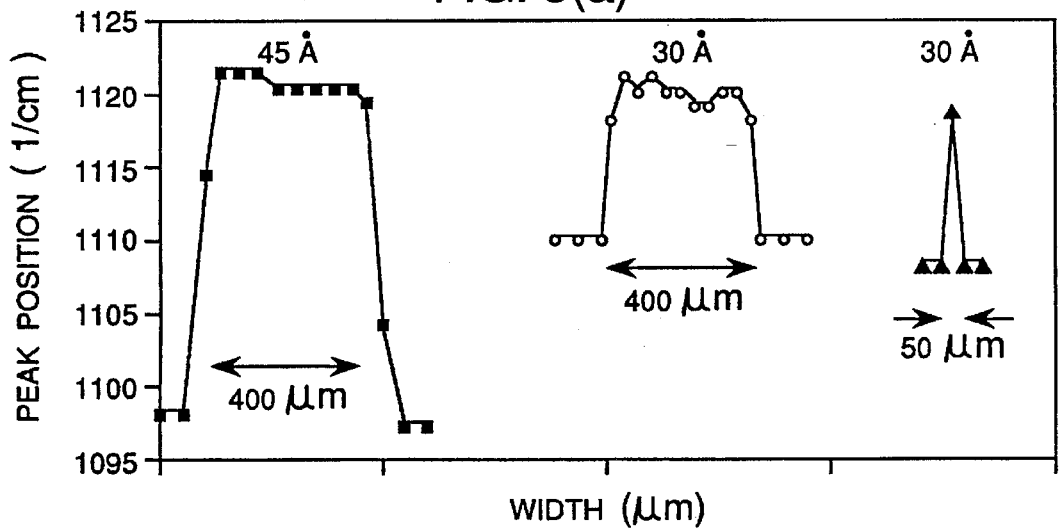
FIG. 5(a) peak position wavenumber from the FTIR spectra across waveguides produced by laser densification on gel-silica monoliths.

FIG. 5a shows the PP value across three laser densified tracks as a function of position. FIG. 5b shows the PP value measured by FTIR, as a function of the bulk density of the 30 Å matrices. FIG. 5c shows the relations between the index of refraction (n) of porous silica matrices and their bulk densities. The change in PP with density is equivalent to a change in n. The PP profiles shown in FIG. 5a are then equivalent to profiles in n across the laser densified tracks. Thus, laser densification of the surface of a porous optical gel-silica matrix leads to a gradient in the index of refraction of the treated region, as desired for a channel waveguide.

The PP profiles for the 400 μm tracks produced in the 30 and 45 Å matrices, FIG. 5, correspond to a step waveguide. In contrast, a smooth index profile is produced in 12 Å matrices. This difference may be due to a higher energy of activation required to densify the larger pores matrices. Sintering results for the 30 and 45 Å matrices show rapid pore closure when sufficient thermal energy is available for the reaction. The 12 Å matrices produce a smoother densification profile because they have an appreciable volume of pores as small as 7 Å in radius, which results in pore closure at much lower temperatures. FIG. 2 shows that only the central portion of the laser beam densifies the silica matrices. This is the region that has sufficient energy to enable the surface of the sample to overcome the activation energy for densification. Details of the densification profiles for the 50 μm wide tracks are not available (FIG. 5a) since their dimensions are too small to resolve with the FTIR microspectrometer. The value shown in FIG. 5a for the PP on the 50 μm densified track has a component of the radiation reflected from the non-densified region, and possibly even a component from the substrate below the densified region. These waveguides will be characterized with respect to their optical properties, such as the intrinsic losses and their far field profiles, in a later study in order to try to optimize the processing technique.

Optical waveguides 50 μm wide can be produced by $CO_2$ laser densification of Type VI porous gel-silica matrices by the method described. Optical data transmission is in general a too expensive choice for low-bandwidth short-distance applications. As the dimensions of the waveguides produced by laser densification comply with international standards for multimode fiber optics, and as direct laser writing is a fairly economic and fast processing technique, it may become the preferred choice for low-bandwidth short-distance applications.

The newly developed Type VI gel-silica porous optical matrices with pore radii in the range of 30 Å were the most suitable substrate for direct laser writing, when compared to matrices of 12 and 45 Å. They present at the same time large processing windows for the production of transparent optical waveguides, high transmission in the UV-VIS spectrum, and ease of production.

Clearly, many modifications and variations of the present invention are possible in light of the above teachings and it is therefore understood, that within the inventive scope of the inventive concept, the invention may be practiced otherwise than specifically claimed.

What is claimed is:

1. An improved process for making waveguide channels in gel-silica wherein a focused laser beam scans across a surface of a substrate, wherein the improvement comprises:

providing a gel-silica substrate wherein a pore radius is about 15 to about 40 angstroms;

providing a pulsed $CO_2$ laser having a focused beam spot diameter of about 50 to 150 microns; and scanning said spot across said surface of said substrate at a speed of about 1 to about 3 cm./s. to deliver about 0.5 W to about 1.5 W to said surface of said substrate to density same and produce a density of about 1 to about 2.5 g/cc.

2. An improved process as defined in claim 1 wherein said substrate provided is a Type VI gel-silica.

3. An improved process as defined in claim 2 wherein said pore radius is about 30 angstroms.

4. An improved process as defined in claim 3 wherein said spot diameter is about 75 microns.

5. An improved process as defined in claim 1 further providing controlling the humidity to be less than 20 percent.

6. An improved process for making waveguide channels in a gel-silica substrate wherein a laser beam scans across said substrate, the improvement comprising:

a) providing a gel-silica substrate having pores of radii from about 15 to about 40 angstroms and b) scanning a laser spot across said substrate to densify same and produce a density of about 1 to about 2.5 g/cc therein.

7. The process of claim 6 wherein a pulse laser generates said laser beam.

* * * * *